United States Patent
Wang et al.

(10) Patent No.: US 10,868,801 B2
(45) Date of Patent: Dec. 15, 2020

(54) METHOD AND SYSTEM FOR ESTABLISHING CONNECTION

(71) Applicant: BANMA ZHIXING NETWORK (HONGKONG) CO., LIMITED, Kowloon (HK)

(72) Inventors: Wenchao Wang, Beijing (CN); Chunhui Zhang, Hangzhou (CN); Yanming Cai, Hangzhou (CN); Ji Zhao, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 74 days.

(21) Appl. No.: 16/216,652

(22) Filed: Dec. 11, 2018

(65) Prior Publication Data

US 2019/0182223 A1      Jun. 13, 2019

Related U.S. Application Data

(63) Continuation-in-part of application No. PCT/CN2017/086914, filed on Jun. 2, 2017.

(51) Int. Cl.
*H04L 29/06* (2006.01)
*H04L 9/08* (2006.01)
*H04L 9/32* (2006.01)
*H04L 29/08* (2006.01)

(52) U.S. Cl.
CPC ........ *H04L 63/0428* (2013.01); *H04L 9/0869* (2013.01); *H04L 9/3247* (2013.01); *H04L 63/08* (2013.01); *H04L 63/0876* (2013.01); *H04L 63/0884* (2013.01); *H04L 63/0892* (2013.01); *H04L 67/02* (2013.01); *H04L 67/141* (2013.01); *H04L 67/146* (2013.01); *H04L 67/26* (2013.01)

(58) Field of Classification Search
CPC . H04L 63/08; H04L 63/0807; H04L 63/0823; H04L 63/083; H04L 63/0838; H04L 63/0846; H04L 63/0884; H04L 63/0892; H04L 63/0876
See application file for complete search history.

(56) References Cited

U.S. PATENT DOCUMENTS

| | | | |
|---|---|---|---|
| 2003/0041136 A1* | 2/2003 | Cheline | H04L 63/0272 709/223 |
| 2009/0228967 A1 | 9/2009 | Gbadegesin | |
| 2010/0318665 A1 | 12/2010 | Demmer | |

(Continued)

FOREIGN PATENT DOCUMENTS

| | | |
|---|---|---|
| CN | 1658553 | 8/2005 |
| CN | 102098317 | 6/2011 |

(Continued)

*Primary Examiner* — Edward Zee
(74) *Attorney, Agent, or Firm* — Van Pelt, Yi & James LLP

(57) ABSTRACT

Establishing a connection is disclosed including acquiring an authentication code, sending data including the authentication code to a management server, receiving parameter information sent back by the management server after the management server performed a successful authentication using the data including the authentication code, and establishing, using the parameter information, a channel to a connection server.

19 Claims, 9 Drawing Sheets

(56) References Cited

U.S. PATENT DOCUMENTS

| | | | |
|---|---|---|---|
| 2012/0204245 A1* | 8/2012 | Ting | H04L 9/3228 |
| | | | 726/6 |
| 2012/0221626 A1 | 8/2012 | Ferris | |
| 2012/0266231 A1 | 10/2012 | Spiers | |
| 2015/0036807 A1 | 2/2015 | Jai | |

FOREIGN PATENT DOCUMENTS

| | | |
|---|---|---|
| CN | 102355480 | 2/2012 |
| CN | 102752269 | 10/2012 |
| WO | 2015196659 | 12/2015 |

\* cited by examiner

600

METHOD AND SYSTEM FOR ESTABLISHING CONNECTION

CROSS REFERENCE TO OTHER APPLICATIONS

This application is a continuation-in-part of and claims priority to International (PCT) Application No. PCT/CN2017/086914, entitled CONNECTION ESTABLISHMENT METHOD, APPARATUS AND DEVICE, filed Jun. 2, 2017 which is incorporated herein by reference for all purposes, which claims priority to China Application No. 201610421385.8, entitled A CONNECTION ESTABLISHING METHOD, MEANS AND DEVICE, filed Jun. 14, 2016 which is incorporated herein by reference for all purposes.

FIELD OF THE INVENTION

The present invention relates to a technique for establishing a connection between a user device and a server.

BACKGROUND OF THE INVENTION

With the development of cloud computing, cloud-based services have gradually expanded, and cloud-user interactions have increased in frequency. Ensuring the security of cloud-user data transmissions due to lack of a centralized authentication is to be continually addressed.

SUMMARY OF THE INVENTION

To ensure the security of cloud-user interactions, the present application discloses a method and a system for establishing a connection.

The present application discloses a method for establishing a connection. The method comprises:
  acquiring, using a user device, an authentication code;
  sending data including the authentication code to a management server;
  receiving parameter information for establishing a channel from the management server, wherein the management server is configured to conduct successful authentication based on the data including the authentication code;
  establishing a channel to a connection server using the parameter information.

In some embodiments, the acquiring of the authentication code comprises:
  acquiring an authentication code from an identification server.

In some embodiments, the acquiring of the authentication code from the identification server comprises:
  sending a unique ID of the user device to the identification server;
  receiving the authentication code for the unique ID of the user device from the identification server.

In some embodiments, the data including the authentication code further comprises: the unique ID of the user device.

In some embodiments, the sending of the data including the authentication code to the management server comprises:
  signing the unique ID of the user device, the authentication code, an application key, and an application secret;
  sending a signature value, the unique ID of the user device, the authentication code, and the application key to the management server.

In some embodiments, the unique ID of the user device is sent to the identification server to obtain an authentication code, the authentication code is received by the management server from the identification server, and the signing of the unique ID is performed by a trusted platform module in the user device.

In some embodiments, the data including the authentication code is sent to the management server via HTTP POST.

In some embodiments, the parameter information is received in the form of an HTTP response.

In some embodiments, the parameter information comprises connection parameters and a seed key for encrypting, decrypting, or both transmission data.

In some embodiments, the receiving of the parameter information for establishing the channel from the management server comprises:
  receiving a message sent back by the management server;
  decrypting, based on the unique ID of the user device, a message header of the received message to obtain the seed key;
  decrypting, based on the seed key, a message body of the message to obtain the connection parameters.

In some embodiments, the connection parameters comprise: session ID, IP address of the connection server, port number, etc.

In some embodiments, the establishing of the channel to the connection server comprises:
  establishing a TCP long connection to the connection server based on the connection parameters;
  sending a channel connection request to the connection server, receiving a channel connection confirmation from the connection server, and establishing a cloud channel to the connection server;
  encrypting, decrypting, or both, based on the seed key, data transmitted on the cloud channel.

In some embodiments, the method further comprises:
  sending and receiving data on the channel asynchronously.

In some embodiments, the receiving of the data on the channel asynchronously comprises:
  receiving and reorganizing data packets sent through the channel based on a finite state machine approach.

In some embodiments, the receiving and reorganizing of the data packets sent through the channel comprises:
  entering a packet receiving and packet length unknown state in the event that, while in a normal received state, a protocol header and variable-length code are not received in their entirety;
  entering a packet receiving and packet length known state in the event that, while in a packet receiving and packet length unknown state, a full-length variable-length code is received and the data packet has not been received in its entirety;
  entering a packet receiving completed state in the event that a new fragment is received and the variable length code and the data packet both are received in their entirety;
  entering the packet receiving completed state in the event that, while in the packet receiving and packet length known state, a new fragment is received and the data packet is received in its entirety;
  while in the packet receiving completed state, reorganizing each fragment belonging to the data packet and then entering the normal received state.

In some embodiments, the method further comprises:
  analyzing the data packets received through the channel;
  in the event that, based on the analysis, the data packets include a push message, extracting application data from the decrypted data packets, the decrypted data packets having a callback for processing by a higher-level business service module.

In some embodiments, the sending of the data on the channel asynchronously comprises:

constructing a request message based on to-be-sent data;

attaching the request message to the end of a remote procedure call (RPC) transmit chain.

In some embodiments, the method further comprises:

after receiving a heartbeat message via the channel, sending back a heartbeat response;

shutting down the channel in the event that no heartbeat message is received through the channel after a set length of time.

In some embodiments, the channel is shut down in the event that an abnormal state develops during execution of the callback.

In some embodiments, the method further comprises:

monitoring, using the user device, network events; and shutting down the channel if a network abnormality occurs.

In some embodiments, after the shutting down of the channel, the method further comprises:

acquiring an authentication code to re-establish a channel to a connection server.

The present application further discloses a method for establishing a connection. The method comprises:

receiving, using a management server, data including an authentication code sent by a user device;

after using the data including the authentication code to perform a successful authentication, sending parameter information for establishing a channel to the user device, the parameter information helping the user device establish a channel to a connection server.

In some embodiments, the data further comprises: unique ID information of the user device;

conducting authentication based on the data including the authentication code comprises:

sending, using the management server, the unique ID information of the user device and the authentication code to an identification server;

receiving, from the identification server, the authentication result for the authentication code.

In some embodiments, the data further comprises unique ID information of the user device:

the conducting of the authentication based on the data including the authentication code comprises:

sending, using the management server, unique ID information of the user device to the identification server;

receiving, from the identification server, the authentication code corresponding to the unique ID information;

verifying, based on the authentication code acquired from the identification server, the authentication code sent by the user device.

In some embodiments, the data further comprises an application key and signature information;

the conducting of the authentication based on the data including the authentication code further comprises:

determining, using the management server, a locally maintained application secret corresponding to the application key;

checking, using the application secret, the unique ID of the user device, the authentication code, and the application key, the signature information sent by the user device;

in the event that the check fails, determining that the authentication fails.

In some embodiments, the data including the authentication code is sent to the management server via an HTTP POST; and the parameter information is sent back to the user device in the form of an HTTP response.

In some embodiments, the parameter information comprises connection parameters and a seed key for encrypting, decrypting, or both transmission data.

In some embodiments, a message header of a message sent back by the management server to the user device includes a seed key encrypted using a unique ID of the user device, and a message body of the message includes connection parameters encrypted using the seed key.

In some embodiments, the connection parameters include a session ID, an IP address of the connection server, and the port number.

The present application further discloses a method for establishing a connection. The method comprises:

receiving, using a connection server, a connection request sent by a user device to establish, using parameter information, a channel to the user device.

In some embodiments, the parameter information is sent back by the management server to the user device after a successful authentication using the authentication code sent by the user device.

In some embodiments, the parameter information comprises: connection parameters and a seed key for encrypting, decrypting, or both transmission data.

In some embodiments, the connection parameters comprise: a session ID, an IP address of the connection server, and a port number.

In some embodiments, the establishing of the channel to the user device comprises:

establishing a TCP long connection to the user device, wherein the TCP long connection is established by the user device using the connection parameter request;

receiving a channel connection request sent by the user device;

sending a channel connection confirmation to the user device to establish a cloud channel to the user device;

encrypting, decrypting, or both, using a seed key, data transmitted on the cloud channel.

In some embodiments, the method further comprises:

synchronizing, using the connection server, correspondences between session IDs and seed keys from the management server;

after receiving a data packet through the channel, determining the seed key corresponding to the session ID included in the data packet and used on the channel.

In some embodiments, the method further comprises:

periodically sending, using the connection server, heartbeat messages through the channel;

shutting down the channel in the event that heartbeat response is not received through the channel after a set length of time.

The present application discloses a method for establishing a connection. The method comprises:

allocating and sending, using an identification server, an authentication code to a user device;

receiving, from a management server, information used for collaborating with the management server to authenticate the user device;

In some embodiments, parameter information is sent back, to the user device, for establishing a channel after a successful authentication using the authentication code sent by the user device.

In some embodiments, the allocating and the sending of the authentication code to the user device comprises:

after the identification server receives the unique ID information sent by the user device, allocating and sending back, using the identification server, an authentication code to the user device.

In some embodiments, the receiving of the information used for collaborating with the management server to authenticate the user device comprises:

after receiving the user device authentication code provided by the management server, verifying the received authentication code and sending back an authentication result to the management server.

In some embodiments, the verifying of the received authentication code comprises:

determining, using the unique ID information together with the received authentication code, a locally maintained authentication code corresponding to the unique ID information;

comparing the determined locally maintained authentication code to the received authentication code;

in response to a determination that the determined locally maintained authentication code matches the received authentication code, determining that the authentication is successful.

In some embodiments, the receiving of the information used for collaborating with the management server to authenticate the user device comprises:

after receiving the unique ID information provided by the management server, sending back the authentication code corresponding to the unique ID information to the management server so that the management server can use the received authentication code to conduct authentication of the user device.

In some embodiments, the authentication code that is locally maintained by the identification server and that corresponds to the unique ID information has an ageing time.

The present application discloses a system for establishing a connection. The system comprises:

an authentication code acquiring module configured to acquire an authentication code;

a parameter acquiring module configured to send data including an authentication code to a management server, and receive parameter information for establishing a channel, the parameter information being sent back by the management server after the management server conducted a successful authentication using the data including the authentication code;

a connection processing module configured to establish a channel to a connection server using the parameter information.

The present application further discloses a system for establishing a connection. The system being installed on a management server and comprising:

an authentication code receiving module configured to receive data including an authentication code sent by a user device;

an authentication processing module configured to conduct authentication using the data including the authentication code;

a parameter processing module configured to, after the authentication is successful, send back parameter information to the user device to establish a channel to help the user device establish a channel to a connection server.

The present application further discloses a system for establishing a connection installed on a connection server. The system comprises:

a connection processing module configured to receive a connection request sent by a user device to establish, using parameter information, a channel between the connection server and the user device, wherein the parameter information is sent back by a management server to the user device after a successful authentication using an authentication code.

The present application further discloses a system for establishing a connection. The system is installed on an identification server and comprises:

an allocating module configured to allocate and send an authentication code to a user device;

an authenticating module configured to receive, from a management server, information used for authenticating, and collaborate with the management server to authenticate the user device, wherein in the event that authentication is performed using the authentication code sent by the user device and the authentication is successful, parameter information for establishing a channel is sent back to the user device.

The present application further discloses a device comprising:

one or more processors;

a memory coupled with the one or more processors, wherein the memory is configured to provide the one or more processors with instructions which when executed cause the one or more processors to:

acquire an authentication code;

send data including the authentication code to a management server;

receive parameter information for establishing a channel and being sent back by the management server after the management server used the data including the authentication code to conduct an authentication successfully;

establish, using the parameter information, a channel between a user device and a connection server.

From the technical scheme above, after authentication has been successful at a management server, a user device can acquire, from the management server, parameter information for establishing a channel and then establish a channel to a connection server. This approach to channel establishment increases the security of cloud-user interactions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
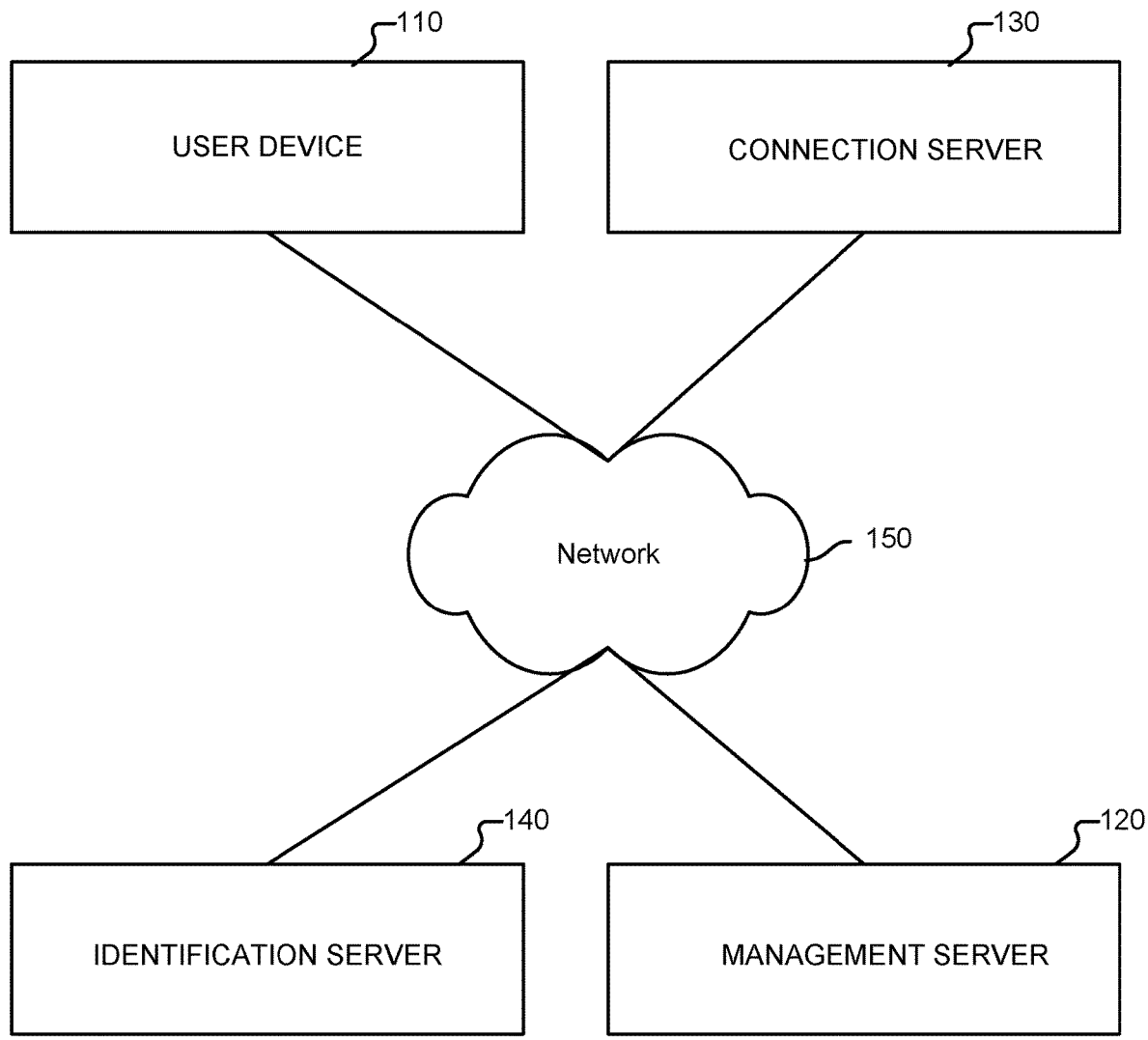
FIG. 1 is an architectural diagram of an embodiment of a system for establishing a connection.

To facilitate understanding of the present application, the system architecture on which the present application is based will first be described. FIG. 1 is an architectural diagram of an embodiment of a system for establishing a connection. As shown in FIG. 1, the system 100 includes a user device 110, a management server 120, and a connection server 130 connected via a network 150. The system 100 can further include an identification server 140. The user device 110 refers to a client device at the user end. Such devices can include: smart mobile terminals, smart home devices, network devices, wearable devices, smart medical devices, personal computers (PCs), etc. The smart mobile devices can include mobile phones, tablets, notebook computers, personal digital assistants (PDAs), etc. The smart home devices can include smart TVs, smart air-conditioning, smart water heaters, smart air purifiers, etc. The network devices can include switches, wireless access points (APs), servers, etc. The wearable devices can include smart watches, smart glasses, smart bracelets, etc. The smart medical devices can include smart thermometers, smart blood pressure monitors, smart blood glucose meters, etc.

The management server 120 and the connection server 130 can be cloud servers. For example, the management server 120 and the connection server 130 can each be an independent server or multiple servers (e.g., a cluster of servers that cooperate to provide services over a network). In another example, the management server 120 and the connection server 130 can be the same server. In yet another example, when multiple connection servers exist, the management server can be set up with one of the connection servers as the same server. The management server is mainly responsible for negotiating the parameter information for establishing channels to user devices. As used herein, a channel refers to a secure communication session between the user device 110 and the connection server 130. After a user device obtains parameter information for a channel, the user device establishes a channel to a connection server. Data subsequently transmitted between the user and the cloud passes through the channel, and security is thus ensured.

The identification server 140 can be an independent server, or can be set up as the same server as the management server. In some embodiments, the identification server is responsible for allocating authentication codes to user devices and maintaining unique ID information of user devices and correspondences with authentication codes. The identification server can verify authentication codes provided by the management server and send back authentication results. The identification server can also send back, to the management server, authentication codes corresponding to unique ID information of user devices provided by the management server.

In some embodiments, each server is named, e.g., management server, identification server, and connection server. The objective of naming the servers is for clarity of the description. In actual applications, servers can be named differently, but can be implemented in the same way or have similar functions.

In some embodiments, the various servers are differentiated as, for example, management server, identification server, and connection server. This differentiation is a logical differentiation done according to the main function that a server performs. In actual applications, each server can be deployed on one piece of computer equipment, or each server can be deployed on multiple pieces of computer equipment. In actual applications, the quantity of each server can be flexibly set based on actual business needs. For example, multiple connection servers exist, and the connection servers provide different services. In another example, multiple management servers including high-level management servers and low-level management servers exist, with low-level management servers being responsible for managing different user devices and high-level management servers being responsible for managing higher-level applications.

Figure 2:
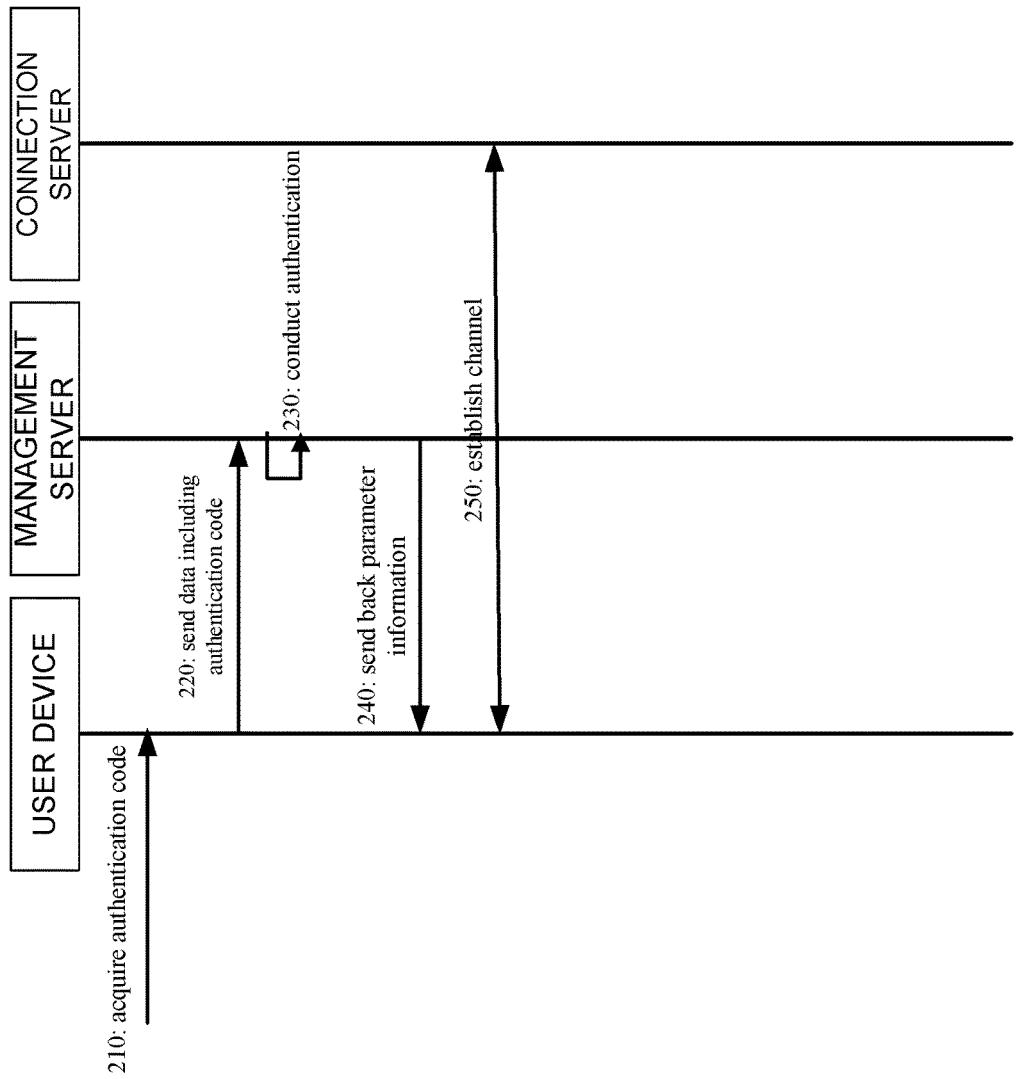
FIG. 2 is a flowchart of an embodiment of a process for establishing a connection.

FIG. 2 is a flowchart of an embodiment of a process for establishing a connection. In some embodiments, the process 200 is implemented by the user device 110 of FIG. 1 and comprises:

In 210, the user device acquires an authentication code.

The authentication code is sent to a management server for use during authentication. There is no restriction on the form that the authentication code can take other than the authentication code must have a degree of randomness and uniqueness within a time range. The authentication code can be generated based on a combination of a unique identifier (ID) of the user device, a timestamp, and a random number, and a signature of the three. An identification server can maintain and allocate authentication codes to user devices. After the allocating of the authentication codes to the user devices, the identification server can locally maintain correspondences between unique ID information of the user devices and the authentication codes.

In 220, the user device sends data including the authentication code to a management server.

In some embodiments, unique ID information of a user device is sent to the management server at the same time that the authentication code is sent or included in the data. The unique ID can be assigned by the device manufacture when the device leaves the factory, and a hardware interface can include the unique ID. Thus, the management server can verify the authentication code using the unique ID information of the user device.

In 230, the management server conducts authentication using the data including the authentication code.

When authenticating, the management server can provide the authentication code to an identification server. After verifying the authentication code, the identification server sends back the authentication result to the management server. The management server can also provide the unique ID information of the user device to the identification server and receive back, from the identification server, the authentication code corresponding to the unique ID information and then verify, using that authentication code from the management server, the authentication code sent by the user device.

Furthermore, the data including the authentication code sent by the user device can further include signature information. This signature information can be used in a check conducted by the management server.

In 240, the management server sends back, to the user device, parameter information for establishing a channel in the event that the authentication is successful.

The parameter information for establishing a channel can include: a seed key and connection parameters. The seed key can be used to encrypt, decrypt, or both transmission data. The connection parameters can be used to establish connections between user devices and connection servers. The connection parameters can include, for example, session ID (SID), IP address of the connection server, and port number.

The data including the authentication code can be sent via an HTTP POST message and be included in the body of the HTTP POST message. The parameter information can be sent in the form of an HTTP response and be included in the body of the HTTP response message.

In 250, the user device establishes a channel to a connection server using the parameter information. Data subsequently transmitted between the user and the cloud passes through this channel.

The establishing of the channel includes three aspects: The first aspect is the process of establishing a long connection between the user device and the connection server using connection parameters. The second aspect is the process of establishing a cloud channel. The third aspect is data encryption/decryption on the cloud channel is configured to use a seed key.

Figure 3:
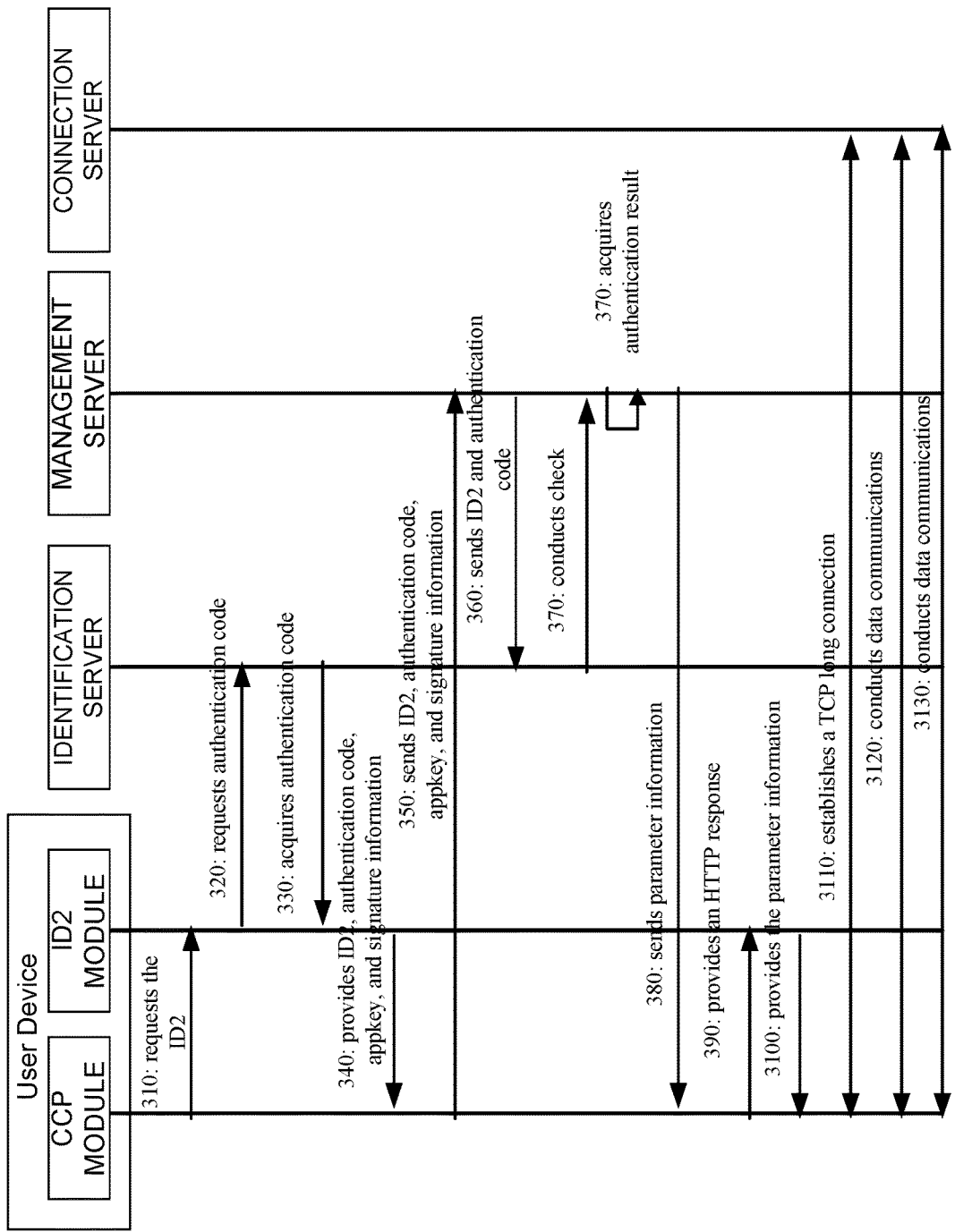
FIG. 3 is a flowchart of another embodiment of a process for establishing a connection.

The above process is described below. FIG. 3 is a flowchart of another embodiment of a process for establishing a connection. The process 300 can be implemented by the user device 110 of FIG. 1.

The Cloud Channel Protocol (CCP) module and the user device unique ID (ID2) module are two modules within the user device. The CCP module can be an execution module on the system level or an execution module on the application level. In the event that the CCP module is an application-level execution module, the ID2 module provides access permission to the application-level module. The ID2 module can be a module installed in a secure execution environment in the user device, e.g., in a trusted platform module. The trusted platform module can be a specialized chip on an endpoint device that stores encryption keys specific to a host system for hardware authentication. Other types of protocols can also be used for cloud-user channels. The process 300 comprises:

In 310, the CCP module requests a user device unique ID (ID2) from the ID2 module.

The process 300 uses a chip set in the user device. In some embodiments, the chip set corresponds with a trusted platform module. The ID2, which cannot be easily falsified or illegitimately acquired, serves as the user device unique ID. This ID2 is secured within the trusted platform module. The trusted platform module serves as the ID2 module. In other words, only the ID2 module has permission to process the ID2. Other modules can request the content of ID2 from the ID2 module.

In the event that the user device is to interact with the cloud, the user device first establishes a CCP channel between the user device and the cloud connection server. At this point, the CCP module can request the ID2 from the ID2 module.

In 320, the ID2 module requests, using a request, an authentication code from the identification server. The request includes the ID2 for the user device.

In some embodiments, the identification server maintains all legitimate ID2s of user devices. In some embodiments, the identification server allocates an authentication code to each legitimate user device. After receiving the request, the identification server can first verify the legitimacy of the ID2 included in the request. The identification server can save the ID2 and a corresponding public key, which can be used to verify the legitimacy of the ID2. If the ID2 is a legitimate user device ID2, the identification server allocates an authentication code to the user device. Otherwise, the identification server refuses to allocate the authentication code to the user device.

In 330, the ID2 module acquires the authentication code sent back by the identification server.

Please note that information exchanged between the ID2 module and the identification server passes through a channel between the ID2 module and the identification server. The connection parameters for the identification server can be preset in the ID2 module. After a connection is established between the ID2 module and the identification server, a key that was agreed upon in advance (the key that was agreed upon in advance can be pre-written into the ID2 module) can be used to encrypt, decrypt, or both, the ID2 and the authentication code. Key negotiations can also be conducted after the connection is established. The negotiated key is then used to encrypt, decrypt, or both the ID2 and the authentication code.

In 340, after signing the ID2, the authentication code, an appkey, and an application secret (appsecret), the ID2 module provides the ID2, the authentication code, the appkey, and the signature information to the CCP module. For example, the appkey is stored on the user device, and the user device signs, using the stored appkey, the ID2, version, and a keyword to obtain the signature value, and combines these pieces of information to form the authentication code.

No restrictions are imposed regarding the form of the signature.

Please note that four parameters—ID2, authentication code, the application key (appkey), and appsecret—are signed, but the sent data does not include the appsecret. In addition, the appkey can originate from the CCP module. In other words, the ID2 module can acquire the appkey from the CCP module before signing. Then, after performing the above signature processing, the ID2 module provides the ID2, the authentication code, the appkey, and the signature information to the CCP module. The sub-processes of the providing operation are not shown in FIG. 3.

In some embodiments, both the acquiring and the signing of the authentication code are performed in the ID2 module. Because the ID2 module is a trusted platform module, the ID2 module is a secure execution environment. Therefore, the authentication code cannot be easily acquired and falsified from the outside. This strengthens security.

In 350, the CCP module sends the ID2, the authentication code, the appkey, and the signature information via HTTP POST to the management server.

In 360, the management server sends the ID2 and the authentication code to the identification server.

In 370, the management server conducts a check using the ID2 of the user device, the authentication code, the appkey, and the signature information and acquires the authentication result of the identification server for the authentication code.

The process of checking signatures can include: first, determine, using the appkey, the corresponding appsecret. Please note that appsecrets corresponding to each appkey are maintained in advance in the management server. Then, the management server can verify the signature information. In some embodiments, the verification is performed by decrypting the signature information using the determined appsecret. A library function or API call can be used to perform the decryption. In other words, the user device locally signs ID2, the authentication code, the appkey, and the appsecret, and the management server compares the locally maintained signature information thus obtained with the decrypted signature information sent by the user device. If they are the same, then the check is successful. Otherwise, the check fails.

After the identification server receives the ID2 and the authentication code sent by the management server, the identification server determines the authentication code corresponding to the received ID2. Authentication codes are allocated to each user device by the identification server, and the identification server locally maintains the authentication codes corresponding to each ID2. Therefore, the identification server can determine the authentication code corresponding to the ID2 provided by the management server and then compare the determined authentication code with the received authentication code. In the event that the authentication codes are the same, then the authentication is successful. Otherwise, the authentication fails. The authentication code can be allocated through random generation, or can be a randomly selected authentication code from an authentication code pool.

Please note that ageing times can be kept for the authentication codes maintained by the identification server. An authentication code can become invalid when a prespecified ageing time has elapsed.

In another authentication implementation, the management server provides the ID2 to the identification server. The identification server is not responsible for verifying the authentication code, but sends the authentication code corresponding to the ID2 back to the management server. The management server verifies, using the authentication code sent back by the identification server, the authentication code provided by the user device. If the authentication codes are not the same, then the authentication fails.

Please note that the checking and verifying of the authentication code can be performed in any order or at the same time. The authentication is successful only when the checking and the verifying of the authentication code are both successful. If one of the checking and the verifying is unsuccessful, then the authentication is determined to have failed.

In some embodiments, the check is conducted first. In the event that the check fails, then it is unnecessary to consider or conduct the authentication code verification. In the event that the check succeeds, then the authentication code verification can be considered or performed. Verification of the authentication code can also be performed first. In the event that the verification succeeds, then the check is conducted. In the event that the verification fails, then it is unnecessary to consider or conduct the check.

In 380, in the event that the authentication is successful, the management server sends the parameter information for establishing a channel to the user device. In some embodiments, the parameter information is sent in the form of an HTTP response. The parameter information for establishing a channel can include a seed key and connection parameters. The connection parameters can include SID, application ID (APID), connection server IP address, and port number.

"SID" represents a session ID and is generated by the management server. The SID can be used to identify one connected session between the user device and the connection server. All subsequent data packets between the user device and the connection server should include this SID.

"APID" represents an application ID for the user device. The APID can be used to identify an application. All channels that use the same application use the same APID. In some embodiments, the APID is optional.

The parameter information that is sent to the user device and that is used to establish a channel also undergoes encryption, which can take the form of: a message header of the HTTP response message sent back by the management server to the user device including a seed key encrypted using the ID2 of the user device. The message body can include the connection parameter encrypted using the seed key.

In 390, the CCP module provides an HTTP response to the ID2 module.

In 3100, the ID2 module analyzes the parameter information that was obtained from the HTTP response and that is for establishing a channel and provides the parameter information to the CCP module.

The analysis can include: decrypting, using the ID2 of the user device, the message header of the HTTP response message to obtain a seed key; and decrypting, using the seed key, the message body to obtain connection parameters such as SID, APID, connection server IP address, port number, etc.

The CCP module can also provide the message header of the HTTP response message to the ID2 module, and the ID2 module can decrypt, using the ID2, the message header of the HTTP response message to obtain the seed key and then provide the seed key to the CCP module. The CCP module can decrypt, using the seed key, the message body of the HTTP response message to obtain connection parameters such as SID, APID, connection server IP address, port number, etc. This implementation is not shown in the drawing.

In 3110, the CCP module establishes, using connection parameters, a TCP long connection to the connection server.

The process for establishing the TCP long connection is well understood and will not be further discussed for conciseness.

In 3120, the CCP module exchanges CCP connection messages with the connection server via the TCP long session, and thus establishes a CCP channel between the user device and the connection server. In other words, the CCP module sends a CCP connection request to the connection server, and the connection server sends back a CCP confirmation to the CCP module.

The example of CCP is used for illustration. Therefore, when a channel is established in this operation, what is exchanged are CCP connection messages. In the event that another channel protocol is employed, then connection messages of another type of channel protocol are to be exchanged.

In 3130, the seed key is used to encrypt/decrypt data transmitted on the cloud channel between the user device and the connection server.

After the management server allocates an SID and seed key to the user device, the management server is to synchronously send the SID and the seed key to the connection server. In other words, the connection server can synchronize a correspondence between the SID and the seed key from the management server. Data packets subsequently sent by the user device on the data channel are to include the SID. The connection server can determine from the SID what seed key is being used on the data channel, i.e., the seed key corresponding to the SID.

The user device encrypts, using the seed key, data packets sent to the connection server and decrypts, using the seed key, data packets sent from the connection server. The connection server encrypts, using the seed key, data packets sent to the user device and decrypts, using the seed key, data packets sent from the user device.

When data is transmitted on the CCP channel, data can be sent and received asynchronously.

Figure 4:
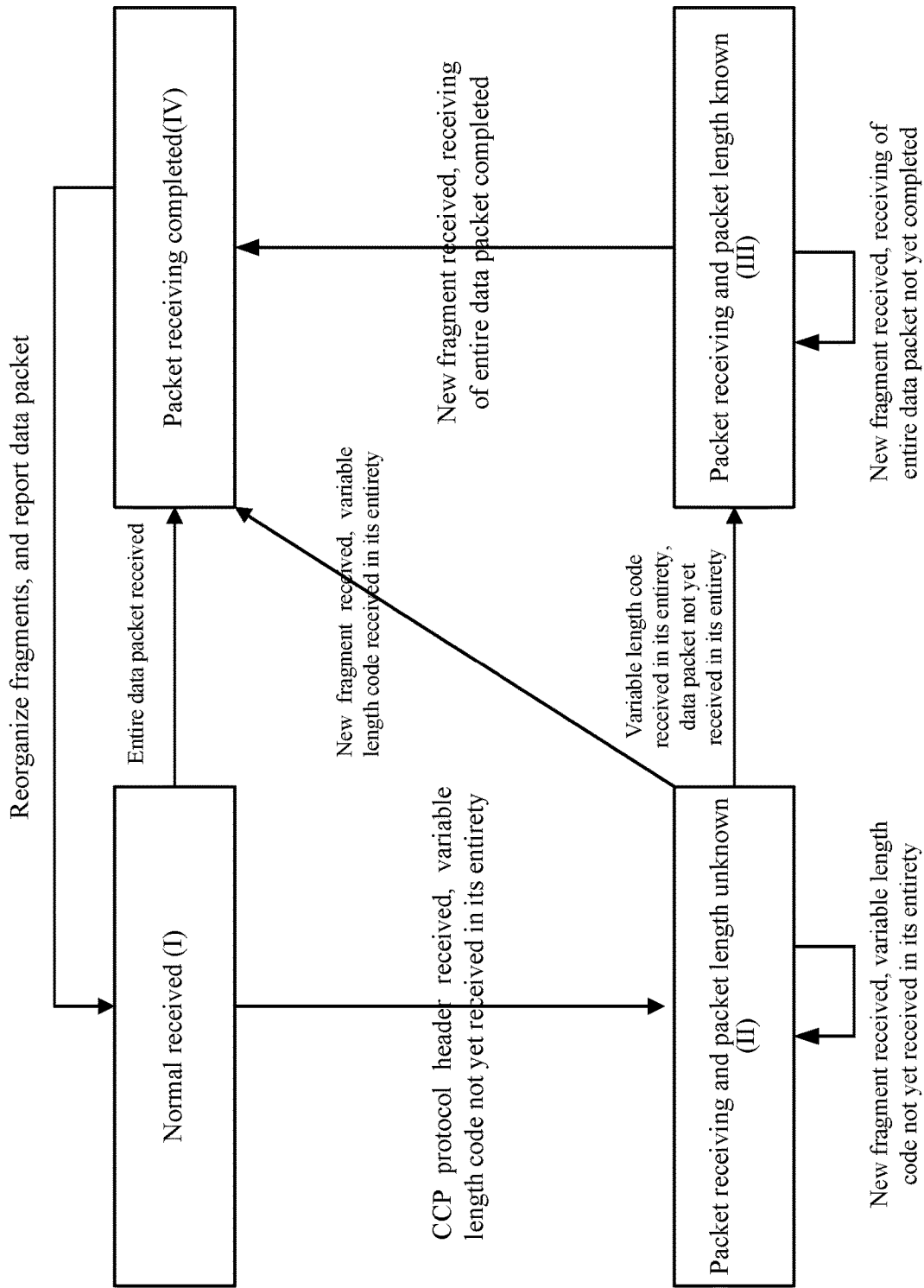
FIG. 4 is a diagram of an embodiment of a finite state machine for establishing a connection.

When data is received via the CCP channel, CCP data sent back by a server is fragmented and scattered and can extend across multiple packets under CCP. Therefore, to analyze each data packet under CCP, a finite state machine approach can be used to receive data packets. FIG. 4 is a diagram of an embodiment of a finite state machine for establishing a connection. The finite state machine 400 includes four main states: normal received state (I), packet receiving and packet length unknown state (II), packet receiving and packet length known state (III), and packet receiving completed state (IV).

The finite state machine 400 enters into the packet receiving and packet length unknown state (II) in the event that, while in the normal received state, a data packet CCP header is received, but the variable length code is not received in its entirety. The finite state machine 400 enters into the packet receiving completed state (IV) in the event that, while in the normal received state, the data packet is received in its entirety.

In the event that, while in the packet receiving and packet length unknown state (II), the finite state machine 400 receives a new fragment, but the variable length code has not yet been received in its entirety, then the finite state machine 400 remains in the packet receiving and packet length unknown state (II). In the event that the variable length code is received in its entirety, but the complete data packet has not yet been received, then the finite state machine 400 enters the packet receiving and packet length known state (III). The finite state machine 400 enters the packet receiving completed state (IV) in the event that a new fragment is received and the variable length code is received in its entirety.

The finite state machine 400 enters the packet receiving completed state (IV) in the event that, while in the packet receiving and packet length known state (III), a new fragment is received and data packet receiving is completed. The finite state machine 400 remains in the packet receiving and packet length known state (III) in the event that a new fragment is received and the entire data packet has not been completely received.

While in the packet receiving completed state (IV), the finite state machine 400 reorganizes each fragment belonging to the same data packet and then, after reporting to the module that analyzes the data packet, the finite state machine 400 enters the normal received state (I).

In the event that the received data is undergoing analysis, the protocol type can be determined based on the packet header, and the payload length can be acquired based on the variable length code. The payload is then decrypted using the seed key. Following completion, a "PUSHACK" message can be constructed and asynchronously sent to the connection server.

In the event that, based on an analysis, the protocol type of the data packets is "PUSH message," then application data can be extracted from the decrypted data packets, with a callback for processing by a higher-level business service module (e.g., For example, the higher-level business service can be a music player). The "PUSH message" can relate to playback, pause, next operation, etc. In various embodiments, the callback can be a function call. In the event that, when executing the callback, the user device develops an abnormality, the user device can shut down the CCP channel. The CCP module can then re-execute the process 300 of FIG. 3 and thus re-establish a CCP channel between the user device and the connection server.

To satisfy the requirements of cross-thread operations when sending data via the CCP channel, the CCP module uses data fields that synchronize variables to buffer message chains that are to be sent. Therefore, in some embodiments, a request message can be constructed using to-be-sent data and then the request message can be attached to the end of an RPC transmit chain. In the event that the to-be-sent data is used to construct the request message, the to-be-sent data can be encrypted using a seed key.

In addition, to ensure channel reliability, a heartbeat detecting mechanism exists on the CCP channel. In other words, the connection server can periodically send a heartbeat message ping. For example, the connection server sends one ping every 70 seconds to the user device. Upon receiving a ping, the user device sends back a heartbeat response ping. The connection server shuts down the CCP channel in the event that the connection server has not received a ping for longer than a set period of time.

The user device periodically checks whether it has received a ping. For example, the user device checks every 10 seconds whether it has received a ping. The user device can shut the CCP channel in the event that it fails to detect receipt of a ping for longer than a set period of time, e.g., no ping is received for more than 120 seconds. After the CCP channel has been shut down for failing to receive a ping, the CCP module can re-execute the process 300 of FIG. 3 and thus re-establish a CCP channel between the user device and the connection server.

In addition, the user device can monitor registered network events. The CCP channel is shut down in the event that a network abnormality occurs. When the network is restored, the CCP module can re-execute the process 300 of FIG. 3 and thus re-establish a CCP channel between the user device and the connection server.

Figure 5:
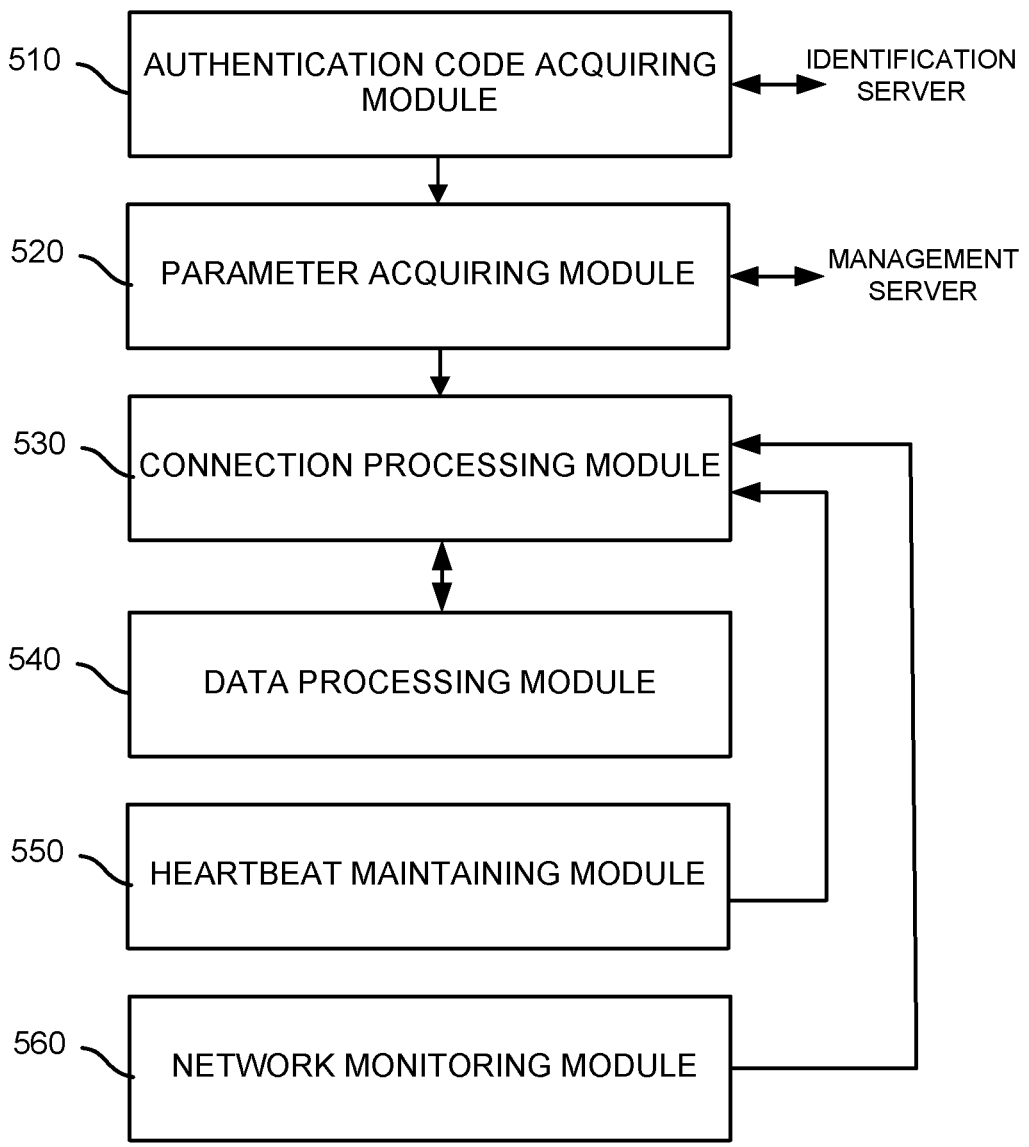
FIG. 5 is a structural diagram of an embodiment of a system for establishing a connection.

FIG. 5 is a structural diagram of an embodiment of a system for establishing a connection. In some embodiments, the system 500 is configured to implement the process 200 of FIG. 2 and comprises: an authentication code acquiring module 510, a parameter acquiring module 520, and a connection processing module 530. In some embodiments, the system 500 further includes a data processing module 540, a heartbeat maintaining module 550, and a network monitoring module 560.

In some embodiments, the authentication code acquiring module 510 is configured to acquire an authentication code. As an example, the authentication code acquiring module 510 acquires the authentication code from an identification server, i.e., sends a unique ID of the user device to the identification server. The authentication code acquiring module 510 receives the authentication code sent back by the identification server for the unique ID of the user device.

In some embodiments, the parameter acquiring module 520 is configured to send data including the authentication code to the management server, receive parameter information for establishing a channel and that was sent back by the management server after the management server conducted a successful authentication using the data including the authentication code.

In some embodiments, the data further comprises: the unique ID of the user device. In addition, the authentication code acquiring module 510 can sign the unique ID of the user device, the authentication code, an appkey, and an appsecret. In the event that the parameter acquiring module 520 sends data including the authentication code to a management server, the parameter acquiring module 520 sends the signature value, the user device unique ID, the authentication code, and the appkey, which were obtained by the authentication code acquiring module 510, to the management server.

The authentication code acquiring module 510 corresponds to the ID2 module in the process 300 of FIG. 3. The authentication code acquiring module 510 can be installed in a trusted platform module of the user device.

The parameter acquiring module 520 can send the data including the authentication code via HTTP POST to the management server. The management server receives the parameter information for establishing a channel in the form of an HTTP response.

The parameter information for establishing the channel can include: a seed key for encrypting, decrypting, or both transmission data and connection parameters. The connection parameters can include: an SID, an IP address of the connection server, a port number, etc.

As an example, when receiving parameter information sent back by the management server, the parameter acquiring module 520 can first receive the message sent back by the management server and then decrypt, using the user device unique ID, a message header of the received message to obtain a seed key. The parameter acquiring module 520 then decrypts, using the seed key, the body of the message to obtain connection parameters.

In some embodiments, the connection processing module 530 is configured to establish, using the parameter information, a channel to a connection server. As an example, the connection processing module 530 can first establish, using the connection parameters, a TCP long connection to a connection server. Then, the connection processing module 530 sends a channel connection request to the connection server and receives a channel connection confirmation sent back by the connection server and thereupon establishes a cloud channel to the connection server. The connection processing module 530 then encrypts, decrypts, or both, using the seed key, data transmitted on the cloud channel.

In some embodiments, the data processing module 540 is configured to send and receive data on the channel asynchronously. As an example, the data processing module 540 can use a finite state machine approach to receive and reorganize data packets sent through the channel. As shown in FIG. 4, the finite state machine approach can include the following states and shifting modes:

The finite state machine enters into the packet receiving and packet length unknown state (II) in the event that, while in the normal received state (I), a data packet protocol header (a CCP header if the channel uses CCP) is received, and the variable length code is not received in its entirety. The finite state machine enters into the packet receiving completed state (IV) in the event that the data packet is received in its entirety.

In the event that, while in the packet receiving and packet length unknown state (II), a new fragment is received, but the variable length code has not yet been received in its entirety, then the finite state machine remains in the packet receiving and packet length unknown state (II). In the event that the variable length code is received in its entirety, but the complete data packet has not yet been received, then the finite state machine enters the packet receiving and packet length known state (III). The finite state machine enters the packet receiving completed state (IV) in the event that a new fragment is received and the variable length code is received in its entirety.

The finite state machine enters the packet receiving completed state (IV) in the event that, while in the packet receiving and packet length known state (III), a new fragment is received and data packet receiving is completed. The finite state machine remains in the packet receiving and packet length known state (III) in the event that a new fragment is received, and the entire data packet has not been completely received.

While in the packet receiving completed state (IV), the finite state machine reorganizes each fragment belonging to the same data packet and then, after reporting to the module that analyzes the data packet, enters the normal received state (I).

Referring back to FIG. 5, the connection processing module 530 analyzes data packets received through the channel, and in the event that, according to the analysis, the data packets are a push message, then the connection processing module 530 extracts application data from the decrypted data packets, with a callback for processing by a higher-level business service module. The channel is shut down in the event that an abnormality occurs while the connection processing module 530 is executing a callback.

When the data processing module 530 sends data asynchronously on the channel, the data processing module 530 can construct, using to-be-sent data, a request message and attach the request message to an end of an RPC transmit chain.

In some embodiments, the heartbeat maintenance module 550 is configured to send back a heartbeat response after receiving a heartbeat message through the channel. Failure to receive a heartbeat message via the channel for longer than a set period of time triggers the connection processing module 530 to shut down the channel.

In some embodiments, the network monitoring module 560 is configured to monitor network events. The occurrence of a network abnormality triggers the connection processing module 530 to shut down the channel.

Regarding the situation described above, the connection processing module 530 triggers the authentication code acquiring module 510 after the channel is shut down to re-execute the operation of acquiring the authentication code to re-establish a channel to the connection server.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 6:
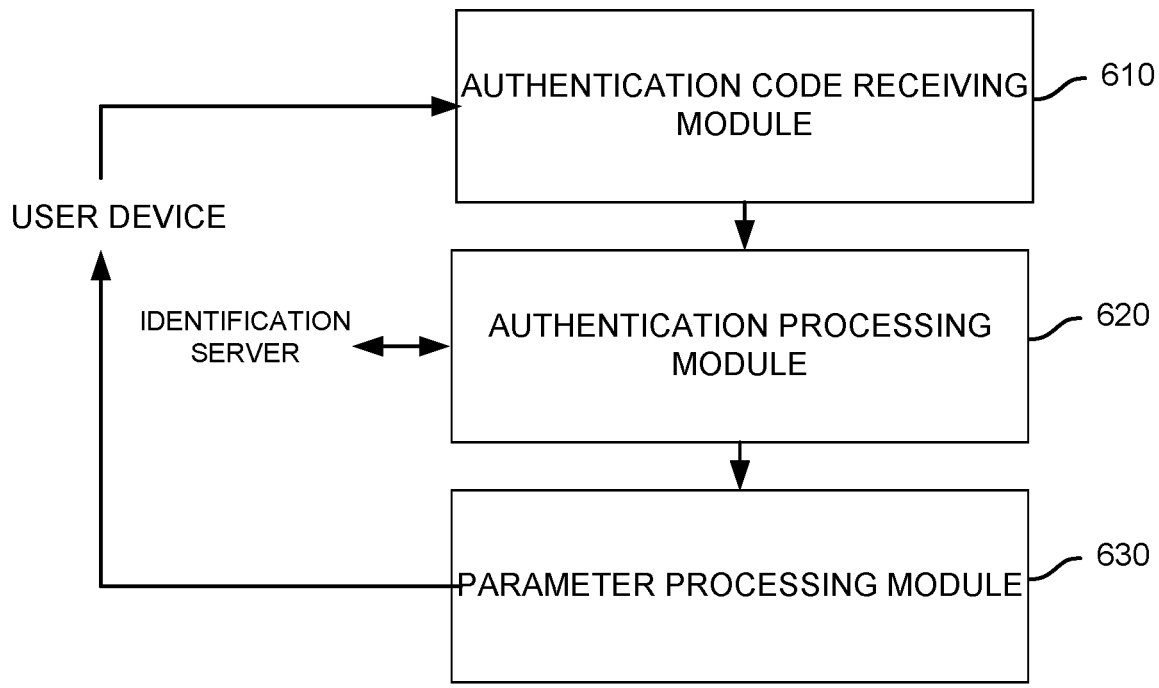
FIG. 6 is a structural diagram of another embodiment of a system for establishing a connection.

FIG. 6 is a structural diagram of another embodiment of a system for establishing a connection. In some embodiments, the system 600 is an implementation of the management server 120 of FIG. 1 and comprises: an authentication code receiving module 610, an authentication processing module 620, and a parameter processing module 630.

In some embodiments, the authentication code receiving module 610 is configured to receive data including an authentication code sent by a user device.

In some embodiments, the authentication processing module 620 is configured to conduct, using the data including the authentication code, authentication.

The data including the authentication code further includes user device unique ID information. In the event that the authentication processing module 620 is conducting authentication, the authentication processing module 620 can employ the two approaches below:

In a first approach, the authentication processing module 620 sends unique ID information of the user device and the authentication code to an identification server and acquires the authentication result for the authentication code sent back by the identification server.

In such an approach, the identification server is responsible for verifying the authentication code. In other words, after receiving the unique ID information and the authentication code sent by the management server, the identification server determines the locally maintained authentication code corresponding to the unique ID information and compares the determined locally maintained authentication code to the received authentication code. If they are the same, the identification server sends back an authentication successful result. If not, the identification server sends back an authentication failed result.

In a second approach, the authentication processing module 620 sends unique ID information of the user device to the identification server, acquires back from the identification server the authentication code corresponding to the unique ID information, and verifies, using the authentication code acquired from the identification server, the authentication code sent by the user device.

Furthermore, the data including the authentication code can also include an appkey and signature information. In such a case, the authentication processing module 620 can, while conducting authentication, further perform the following: determine the appsecret corresponding to the appkey, and check, using the appsecret, the user device unique ID, the authentication code, and the appkey, the signature information sent by the user device. In the event that the check fails, then the authentication fails. In other words, the authentication performed by the authentication processing module 620 can include checking signatures and verifying authentication. Authentication succeeds if both the checking of the signatures and the verifying of the authentication are successful. If either one fails, then the authentication fails.

The parameter processing module 630 is configured to, after the authentication succeeds, send back, to the user device, parameter information for a channel to help the user device establish a channel to a connection server.

The authentication code receiving module 610 receives data including an authentication code sent via HTTP POST. The parameter processing module 630 takes the parameter information for establishing a channel and sends the parameter information back to the user device in the form of an HTTP response.

The parameter information for establishing a channel can include: a seed key for encrypting, decrypting, or both transmission data, and connection parameters. The connection parameters can include: SID, IP address of connection server, and port number. A message header of the message sent back by parameter processing module 630 to the user device includes a seed key encrypted using a unique ID of the user device, and a message body of the message includes connection parameters encrypted using the seed key.

Figure 7:
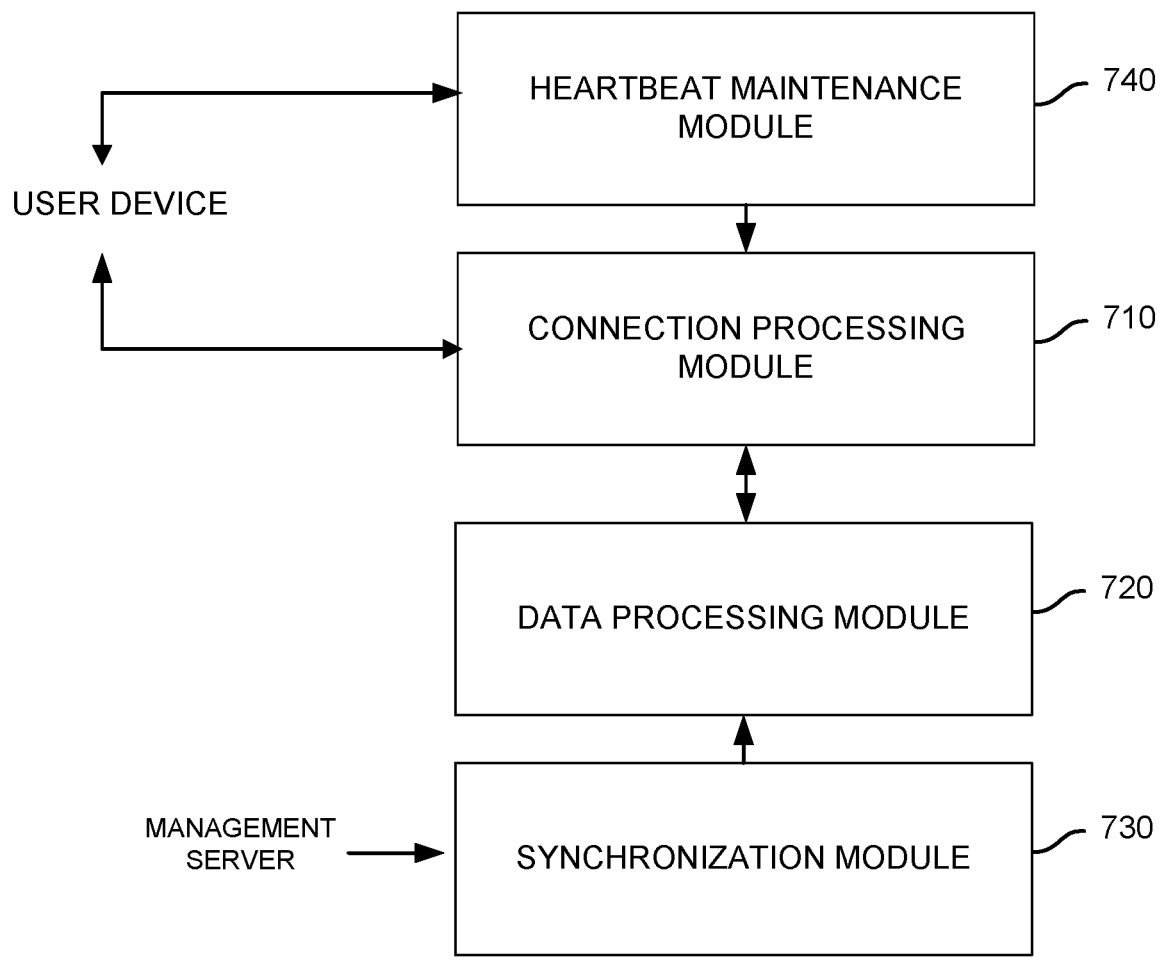
FIG. 7 is a structural diagram of yet another embodiment of a system for establishing a connection.

FIG. 7 is a structural diagram of yet another embodiment of a system for establishing a connection. In some embodiments, the system 700 is an implementation of the connection server 130 of FIG. 1 and comprises: a connection processing module 710, a data processing module 720, a synchronization module 730, and a heartbeat maintenance module 740.

In some embodiments, the connection processing module 710 is configured to receive a connection request sent by a user device to establish, using parameter information, a channel between the connection server and the user device. In some embodiments, the parameter information is sent back to the user device by the management server after successful authentication using an authentication code sent by the user device.

The parameter information for establishing the channel includes: a seed key for encrypting, decrypting, or both transmission data and connection parameters. The connection parameters can include: SID, IP address of connection server, and port number.

After the channel is established, the connection processing module 710 establishes a TCP long connection between the connection server and the user device (the TCP long connection is established by the user device using parameter information). The connection processing module 710 receives a channel connection request sent by the user device and sends a channel connection confirmation to the user device, thus establishing a cloud channel to the user device. The data processing module 720 encrypts, decrypts, or both, using the seed key, data transmitted on the cloud channel.

The synchronization module 730 is configured to synchronize SID-seed key correspondences from the management server. After the data processing module 720 receives data packets via the channel, the data processing module 720 determines the seed key corresponding to the SID included in the data packet on the channel and encrypts, decrypts, or both, using the seed key, transmitted data.

In addition, to ensure channel reliability, the heartbeat maintenance module 740 periodically sends a heartbeat message through the channel. Failure to receive a heartbeat response via the channel for longer than a set period of time triggers the connection processing module 710 to shut down the channel.

Figure 8:
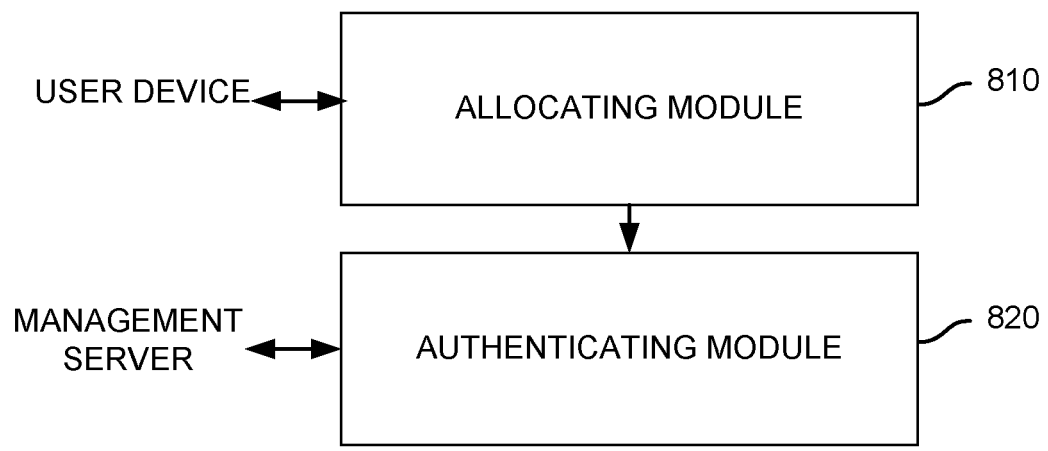
FIG. 8 is a structural diagram of yet another embodiment of a system for establishing a connection.

FIG. 8 is a structural diagram of yet another embodiment of a system for establishing a connection. In some embodiments, the system 800 is an implementation of the identification server 140 of FIG. 1 and comprises: an allocating module 810 and an authenticating module 820.

In some embodiments, the allocating module 810 is configured to allocate and send an authentication code to a user device. As an example, after the allocating module 810 receives unique ID information sent by the user device, the allocating module 810 allocates and sends back an authentication code to the user device. The allocating of the authentication code can be through random generation, or by randomly selecting an authentication code from an authentication code pool.

The identification server locally maintains correspondences between unique ID information and authentication codes. In addition, each authentication has an ageing time. The authentication code becomes invalid when the ageing time elapses.

In some embodiments, the authenticating module 820 is configured to receive, from the management server, information used for authentication, and the authenticating module 820 collaborates with the management server in authenticating the user device. The result of the authentication is used in the following: the management server sends back, to the user device, parameter information for establishing a channel based on a successful authentication result.

The authenticating module 820 can have two implementations:

First implementation: After receiving the authentication code of the user device provided by the management server, the authenticating module 820 verifies the received authentication code and sends back the authentication result to the management server.

As an example, the authenticating module 820 can determine, using the user device unique ID information that was received together with the user device authentication code, the locally maintained authentication code corresponding to the user device unique ID information and compare the determined locally maintained authentication code to the received authentication code. In the event that the determined locally maintained authentication code and the received authentication code are the same, the authentication is successful; otherwise, the authentication fails.

Second implementation: After receiving the unique ID information of the user device provided by the management server, the authenticating module 820 sends back the authentication code corresponding to the unique ID information to the management server so that the management server can conduct, using the received authentication code, authentication.

The above processes and systems provided by embodiments of the present application can be broadly applied to various fields. For example, they may be applied to secure communications between cloud servers and various smart home devices and smart automobiles and other things in the Internet of Things. The connection server can be an application server that provides specific services for Internet of Things devices.

As an example, an ID2, which is allocated to a smart television, is prewritten into a trusted platform module in the smart television. An authentication code is acquired from an identification server based on the ID2. After authentication based on the authentication code is successful in a management server, connection parameters for a connection server are acquired from the management server. The connection server can be a video server. The connection parameters can include seed key, session ID, video server IP address, port number, or any combination thereof. The smart television can further establish, using the acquired video server IP address and port number, a CCP channel to the video server. The data exchanged between the smart television and the video server on the CCP channel is encrypted using the seed key, and the channel session is identified using the session ID among the connection parameters. A secure connection between the smart television and the video server exists.

Figure 9:
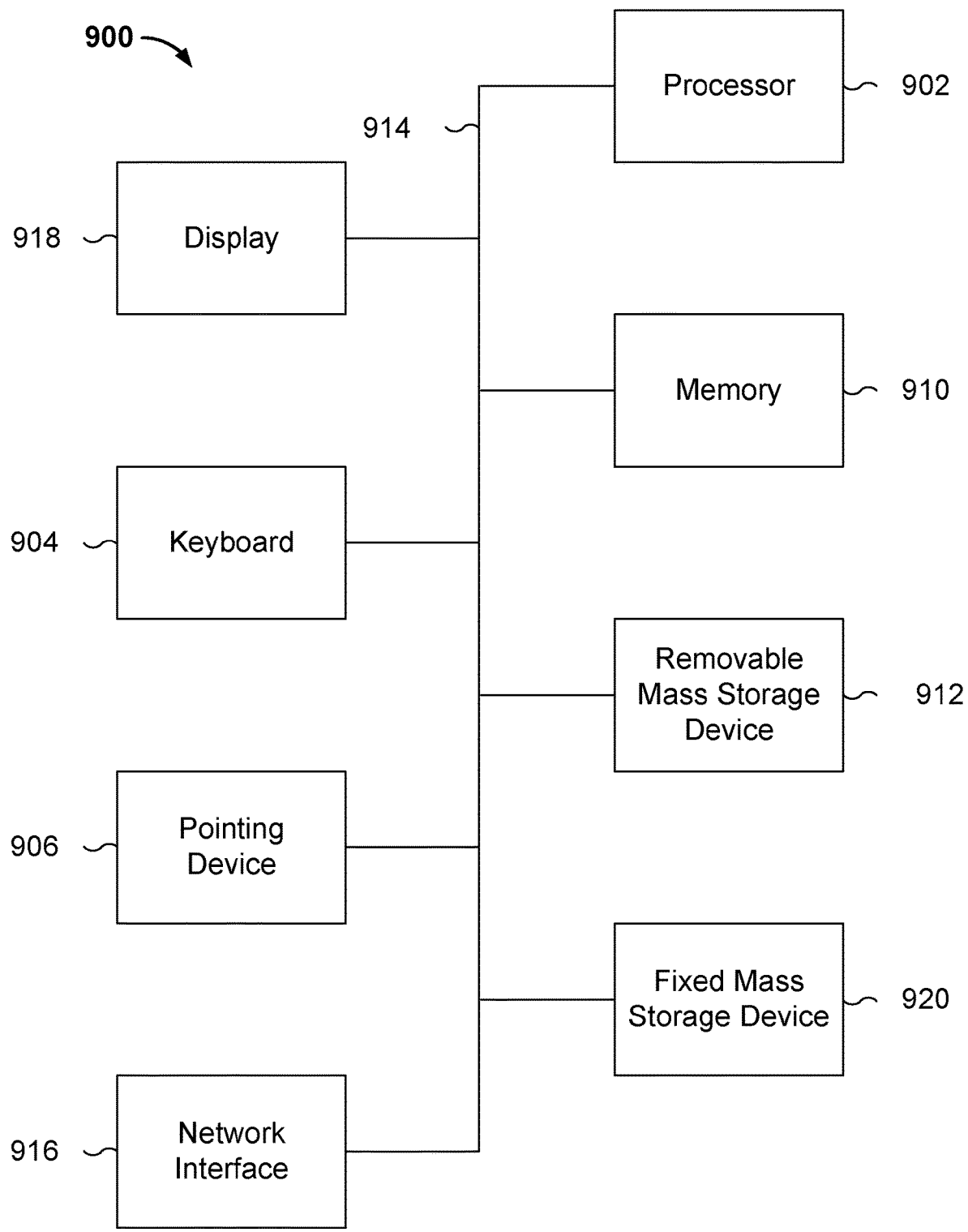
FIG. 9 is a functional diagram illustrating a programmed computer system for establishing a connection in accordance with some embodiments.

FIG. 9 is a functional diagram illustrating a programmed computer system for establishing a connection in accordance with some embodiments. As will be apparent, other computer system architectures and configurations can be used to establish a connection. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    acquiring, using a user device, an authentication code;
    sending, using the user device, data including a unique ID of the user device and the authentication code to a management server, wherein the sending of the data including the unique ID of the user device and the authentication code to the management server comprises:
        signing the unique ID of the user device, the authentication code, an application key, and an application secret; and
        sending a signature value, the unique ID of the user device, the authentication code, and the application key to the management server, wherein the unique ID, a version, and a keyword are signed using the application key to obtain the signature value;
    receiving, using the user device, parameter information sent back by the management server after the management server performed a successful authentication using the data including the authentication code; and
    establishing, using the parameter information, a channel to a connection server.

2. The method as described in claim 1, wherein the acquiring of the authentication code comprises:
    acquiring the authentication code from an identification server.

3. The method as described in claim 2, wherein the acquiring of the authentication code comprises:
    sending, using the user device, a unique ID of the user device to the identification server; and
    receiving the authentication code for the unique ID of the user device sent back by the identification server.

4. The method as described in claim 1, wherein the parameter information comprises:
    connection parameters and a seed key for encrypting, decrypting, or both transmission data.

5. The method as described in claim 4, wherein the connection parameters comprise:
    a session ID (SID), an IP address of the connection server, a port number, or any combination thereof.

6. The method as described in claim 4, wherein the establishing of the channel to the connection server comprises:
    establishing, using the connection parameters, a TCP long connection to the connection server;
    sending a channel connection request to the connection server;
    receiving a channel connection confirmation sent back by the connection server to establish a cloud channel to the connection server; and
    encrypting, decrypting, or both, using the seed key, data transmitted on the cloud channel.

7. The method as described in claim 1, further comprising:
    sending data on the channel asynchronously; and
    receiving data on the channel asynchronously.

8. The method as described in claim 7, wherein the receiving of the data on the channel asynchronously comprises:
    receiving and reorganizing, using a finite state machine approach, data packets sent through the channel.

9. The method as described in claim 1, further comprising:
    analyzing data packets received through the channel; and
    in the event that, based on the analysis of the data packets, the data packets include a push message, extracting application data from the data packets with a callback for processing by a higher-level business service module.

10. A method, comprising:
    acquiring, using a user device, an authentication code;
    sending, using the user device, data including the authentication code to a management server;
    receiving, using the user device, parameter information sent back by the management server after the management server performed a successful authentication using the data including the authentication code, wherein the parameter information comprises: connection parameters and a seed key for encrypting, decrypting, or both transmission data, wherein the receiving of the parameter information sent back by the management server comprises:
  receiving a message sent back by the management server;
  decrypting, using a unique ID of the user device, a message header of the received message to obtain the seed key; and
  decrypting, using the seed key, a message body of the message to obtain the connection parameters; and
establishing, using the parameter information, a channel to a connection server.

11. A method, comprising:
acquiring, using a user device, an authentication code;
sending, using the user device, data including the authentication code to a management server;
receiving, using the user device, parameter information sent back by the management server after the management server performed a successful authentication using the data including the authentication code;
establishing, using the parameter information, a channel to a connection server;
sending data on the channel asynchronously; and
receiving data on the channel asynchronously, comprising:
  receiving and reorganizing, using a finite state machine approach, data packets sent through the channel, wherein the receiving and reorganizing of the data packets sent through the channel comprises:
    entering a packet receiving and packet length unknown state in the event that, while in a normal received state, a protocol header and variable-length code have not been received in their entirety;
    entering a packet receiving and packet length known state in the event that, while in the packet receiving and packet length unknown state, a full-length variable-length code is received and a data packet has not yet been received in its entirety;
    entering a packet receiving completed state in the event that a new fragment is received and the variable length code and a data packet are both received in their entirety;
    entering the packet receiving completed state in the event that, while in the packet receiving and packet length known state, a new fragment is received and the data packet is received in its entirety; and
    while in the packet receiving completed state, reorganizing each fragment belonging to the data packet and entering the normal received state.

12. A method, comprising:
receiving, using a management server, data including an authentication code sent by a user device, wherein the data including the authentication code further comprises: a unique ID information of the user device, an application key, and signature information;
conducting, using the data including the authentication code, an authentication, comprising:
  sending the unique ID information of the user device and the authentication code to an identification server;
  acquiring back from the identification server an authentication result for the authentication code;
  determining a locally maintained application secret (appsecret) corresponding to the application key;
  checking, using the appsecret, the unique ID information of the user device, the authentication code, and the application key, the signature information sent by the user device; and
  determining that the authentication fails in the event that the check fails; and
after conducting a successful authentication, sending back, to the user device, parameter information for establishing a channel to help the user device establish the channel to a connection server.

13. The method as described in claim 12, wherein:
the conducting of the authentication further comprises:
  sending the unique ID information of the user device to the identification server;
  acquiring back, from the identification server, the authentication code corresponding to the unique ID information; and
  verifying, using the authentication code acquired from the identification server, the authentication code sent by the user device.

14. The method as described in claim 12, wherein the parameter information comprises:
connection parameters and a seed key for encrypting, decrypting, or both transmission data.

15. The method as described in claim 14, wherein the connection parameters comprise:
a session ID (SID), an IP address of the connection server, a port number, or any combination thereof.

16. A system, comprising:
a processor; and
a memory coupled with the processor, wherein the memory is configured to provide the processor with instructions which when executed cause the processor to:
  acquire an authentication code;
  send data including a unique ID of user device and the authentication code to a management server, wherein the sending of the data including the unique ID of the user device and the authentication code to the management server comprises to:
    sign the unique ID of the user device, the authentication code, an application key, and an application secret; and
    send a signature value, the unique ID of the user device, the authentication code, and the application key to the management server, wherein the unique ID, a version, and a keyword are signed using the application key to obtain the signature value;
  receive parameter information sent back by the management server after the management server performed a successful authentication using the data including the authentication code; and
  establish, using the parameter information, a channel to a connection server.

17. A system, comprising:
a processor; and
a memory coupled with the processor, wherein the memory is configured to provide the processor with instructions which when executed cause the processor to:
  acquire an authentication code;
  send data including the authentication code to a management server;
  receive parameter information sent back by the management server after the management server performed a successful authentication using the data including the authentication code, wherein the parameter information comprises: connection parameters and a seed key for encrypting, decrypting, or both transmission data, wherein the receiving of the parameter information sent back by the management server comprises to:
  receive a message sent back by the management server;
  decrypt, using a unique ID of user device, a message header of the received message to obtain the seed key; and
  decrypt, using the seed key, a message body of the message to obtain the connection parameters; and
  establish, using the parameter information, a channel to a connection server.

18. A system, comprising:
a processor; and
a memory coupled with the processor, wherein the memory is configured to provide the processor with instructions which when executed cause the processor to:
  acquire, using a user device, an authentication code;
  send, using the user device, data including the authentication code to a management server;
  receive, using the user device, parameter information sent back by the management server after the management server performed a successful authentication using the data including the authentication code;
  establish, using the parameter information, a channel to a connection server;
  send data on the channel asynchronously; and
  receive data on the channel asynchronously, comprising to:
    receive and reorganize, using a finite state machine approach, data packets sent through the channel, wherein the receiving and reorganizing of the data packets sent through the channel comprises to:
      enter a packet receiving and packet length unknown state in the event that, while in a normal received state, a protocol header and variable-length code have not been received in their entirety;
      enter a packet receiving and packet length known state in the event that, while in the packet receiving and packet length unknown state, a full-length variable-length code is received and a data packet has not yet been received in its entirety;
      enter a packet receiving completed state in the event that a new fragment is received and the variable length code and a data packet are both received in their entirety;
      enter the packet receiving completed state in the event that, while in the packet receiving and packet length known state, a new fragment is received and the data packet is received in its entirety; and
      while in the packet receiving completed state, reorganize each fragment belonging to the data packet and entering the normal received state.

19. A system, comprising:
a processor; and
a memory coupled with the processor, wherein the memory is configured to provide the processor with instructions which when executed cause the processor to:
receive, using a management server, data including an authentication code sent by a user device, wherein the data including the authentication code further comprises: a unique ID information of the user device, an application key, and signature information;
conduct, using the data including the authentication code, an authentication, comprising to:
  send the unique ID information of the user device and the authentication code to an identification server;
  acquire back from the identification server an authentication result for the authentication code;
  determine a locally maintained application secret (appsecret) corresponding to the application key;
  check, using the appsecret, the unique ID information of the user device, the authentication code, and the application key, the signature information sent by the user device; and
  determine that the authentication fails in the event that the check fails; and
after conducting a successful authentication, send back, to the user device, parameter information for establishing a channel to help the user device establish the channel to a connection server.

* * * * *